May 28, 1929.　　　F. B. PEDERSEN　　　1,715,210
CUTTING DEVICE
Filed April 7, 1928　　　2 Sheets-Sheet 1
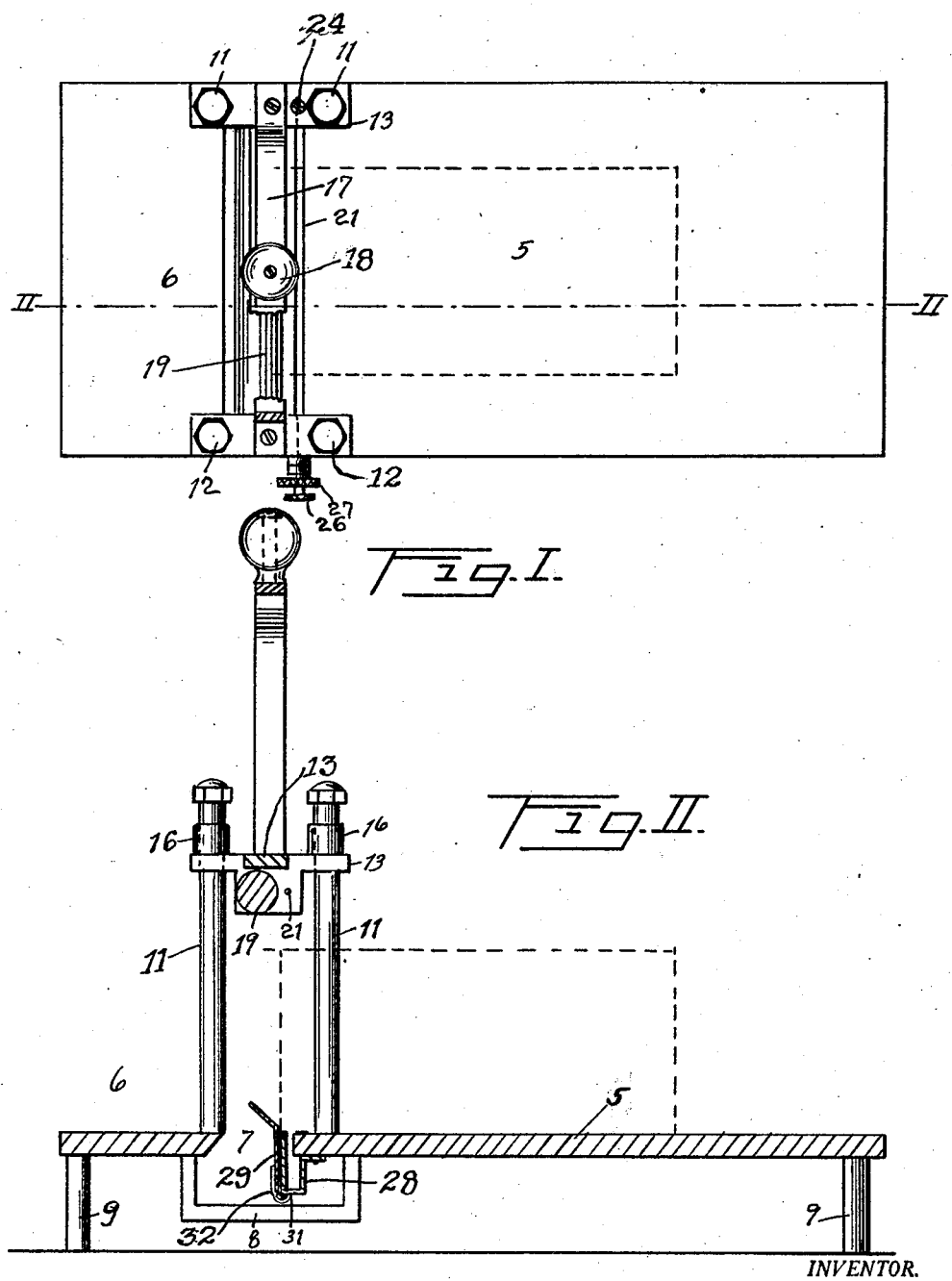

May 28, 1929.  F. B. PEDERSEN  1,715,210
CUTTING DEVICE
Filed April 7, 1928   2 Sheets-Sheet 2
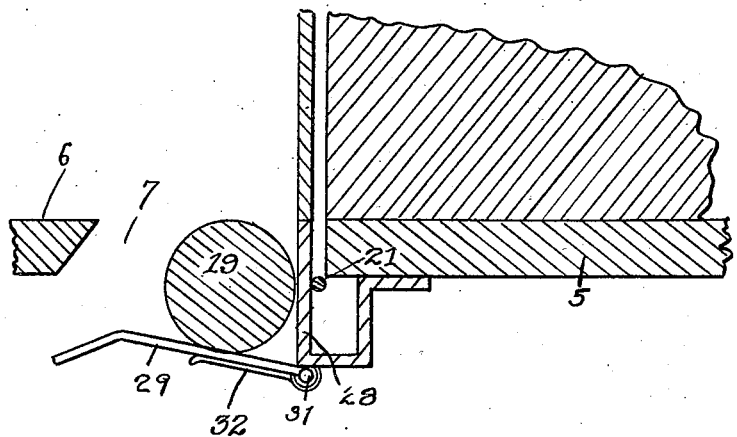
Fig. III.
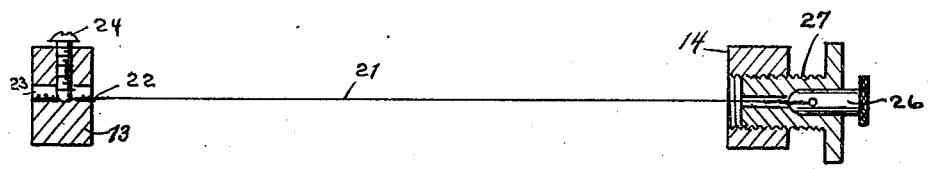
Fig. IV.
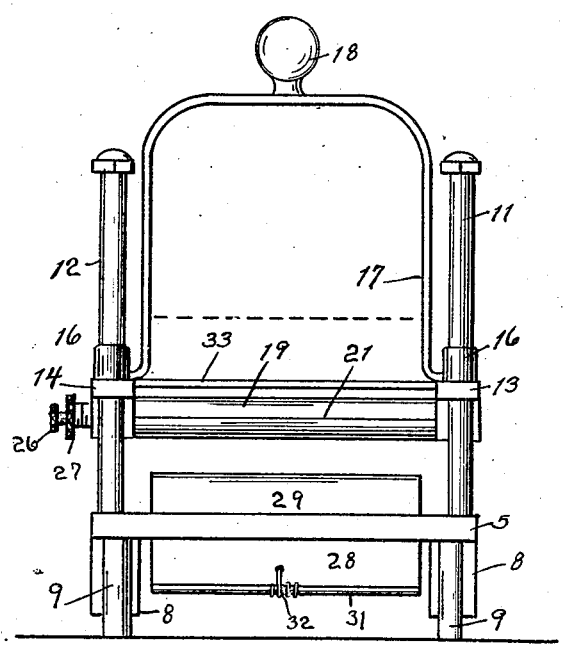
Fig. V.
INVENTOR.
F. B. PEDERSEN
BY Victor J. Evans
ATTORNEYS.

Patented May 28, 1929.  1,715,210

UNITED STATES PATENT OFFICE.

FLORIAN B. PEDERSEN, OF ALAMEDA, CALIFORNIA, ASSIGNOR OF ONE-FOURTH TO ANDERS E. ANDERSEN, OF OAKLAND, CALIFORNIA.

CUTTING DEVICE.

Application filed April 7, 1928. Serial No. 268,222.

This invention relates to improvements in cutting devices and has particular reference to a device for the slicing or cutting of cheese, butter and the like commodities.

The principal object of this invention is to provide means whereby cheese or the like may be sliced in a uniform manner.

Another object is to produce a device of this character wherein the slicing or cutting element is of such a small area that the commodity being cut will not adhere thereto as is the case with a knife.

A further object is to provide means whereby the slice is compressed against the body from which it is being cut, thereby maintaining a uniform thickness throughout the cut.

A still further object is to provide means whereby the cut slice is supported throughout the cutting operation so that the cutting element may pass entirely there-through.

Other objects and advantages will be apparent during the course of the following description.

In the accompanying drawings forming a part of this specification and in which like numerals are employed to designate like parts throughout the same, Figure I is a top plan view of my device partly broken away in order to illustrate parts thereof, Figure II is a cross section taken on the line 2—2 of Figure I, Figure III is an enlarged fragmentary detail view of the cutting element and compressing element at their lower point of travel, Figure IV is an enlarged detail view of the cutting element and Figure V is an end elevation of Figure I.

In the cutting of cheese and the like commodities, when a knife is employed, the knife having such a large area adheres both to the body of the cheese and also to the slices being cut, making the cutting operation much more difficult. Further in using a cutting element of this character, the portion of the cheese immediately beneath the cutter is compressed and a ragged cut is made.

By producing a cutting element and a roller adjacent thereto, the result is that the roller maintains the cheese and thus makes much better slices.

In the accompanying drawings wherein for the purpose of illustration is shown a preferred embodiment of my invention the numerals 5 and 6 refer to the bed of the device and it is preferable to make this bed of a non-corrosive material such as glass, porcelain etc.

The portions of the bed 5 and 6 are spaced from each other as shown at 7 and are held in this spaced relation as by a bracket 8 formed upon each side of the device. Suitable supporting lugs are shown at 9. A pair of parallel spaced guide rods 11 are positioned upon one side of the device and a similar pair of parallel spaced guide rods 12 are positioned upon the opposite side of the device.

The guide rods 11 and 12 each support sliders as shown at 13 and 14, respectively. In order to prevent the sliders 13 and 14 from clamping upon the rods 11 and 12, I form extensions 16, the function of which is well known.

A U-shaped handle 17 is connected between the sliders 13 and 14 and carries a hand knob 18 upon its upper extremity. Secured between the sliders 13 and 14 is a roller 19, which is freely rotatable.

At 21 I have shown a cutting element which consists of a wire having one end doubled and twisted upon itself as shown at 22, which end is secured in a hole 23 by means of a contacting screw 24. The opposite end of the wire is passed through a retaining lug 26, which lug is rotatable in a tension screw 27 carried in the slider 14.

Referring now to Figures II and III, it will be noted that a substantially U-shaped slice support 28 is secured to the bed 5. By viewing these figures, it will also be noted that the free end of this member is vertically disposed and spaced from the bed 5 a distance sufficient to permit the cutting wire 21 to pass there-between.

It will also be noted that this slice supporting member does not extend above the top plane of the bed 5. At 29 I have shown a gauge element hinged as at 31 to the U-shaped member 28 and normally maintained in the position shown in Figure II by a spring 32.

In order to prevent the sliders 13 and 14 from being drawn towards each other when the wire 21 is tightened, I provide a cross brace 33.

The operation of my device is as follows:—

Assuming that a block of cheese has been placed upon the bed 5 as shown in dotted lines in Figures I, II and V, the block of cheese is moved until it comes into engagement with the gauge 29 (see Figure II). By now applying pressure to the knob 18 the sliders 13 and 14 will be moved downwardly which will carry the roller 19 into engagement with the face of the cheese, after which the wire 21 will come into contact with the top of the cheese and further movement will cause the wire to pass downwardly over the cheese, cutting a slice therefrom.

During the cutting operation the roller will compress that portion of the cheese being cut, thereby maintaining a uniform thickness of cut. As soon as the roller has reached a point almost at the bottom of its travel the roller will engage the upper end of the gauge 29 and will start to pivot the same about its hinged connection 31. The roller will then pass downwardly through the opening 7, and at the same time the cutting wire 21 will pass downwardly between the end of the bed 5 and the slice support 28, coming to rest in the position shown in Figure III.

The slice will now fall away from the cheese and will be found to be of uniform thickness. When the roller and the cutting element have been elevated the cheese may be moved forwardly and a further slicing operation may take place.

It is to be understood that the form of my invention herewith shown and described is to be taken as a preferred example of the same, and that various changes relative to the shape, size, material and arrangement of parts may be resorted to without departing from the spirit of the invention, or the scope of the subjoined claim.

Having thus described my invention, I claim :—

In a device of the character described a base, parallel spaced rods positioned on said base, a pair of spaced sliders positioned on said rods, a roller extending between said sliders, a cutting element extending between said sliders and parallelly spaced from said roller, means for raising or lowering said sliders on said rods, a slice supporting member positioned beneath said bed and having its free end vertically disposed and spaced from said bed, and a gauge hinged to said slice support, said gauge having its upper extremity normally supported at a point above the top plane of said base.

In testimony whereof I affix my signature.

FLORIAN B. PEDERSEN.